(12) United States Patent
Van Thorre

(10) Patent No.: US 6,936,110 B2
(45) Date of Patent: Aug. 30, 2005

(54) GRAIN FRACTIONATION

(75) Inventor: Doug Van Thorre, Minneapolis, MN (US)

(73) Assignee: Biorefining, Inc., Golden Valley, MN (US)

(*) Notice: Subject to any disclaimer, the term of this patent is extended or adjusted under 35 U.S.C. 154(b) by 87 days.

(21) Appl. No.: 10/615,494

(22) Filed: Jul. 8, 2003

(65) Prior Publication Data

US 2005/0016525 A1 Jan. 27, 2005

(51) Int. Cl.[7] .............................................. C08B 30/04
(52) U.S. Cl. ........................................ 127/68; 127/24
(58) Field of Search .................................... 127/24, 68

(56) References Cited

U.S. PATENT DOCUMENTS 3,474,722 A * 10/1969 Stewart et al. .............. 426/442
4,936,919 A * 6/1990 Schurmann .................. 127/23

* cited by examiner

Primary Examiner—David Brunsman
(74) Attorney, Agent, or Firm—Schwegman, Lundberg, Woessner & Kluth, P.A.

(57) ABSTRACT

The present invention includes a method for extracting protein, oil and starch from grain. The method includes: Providing kernels or seeds comprising a germ and pericarp comprising protein, oil, and starch; Steeping the kernels or seeds in a steeping reactor for a time effective to soften the kernels and seeds; Milling the steeped corn kernels to separate the germ from the starch/pericarp forming a germ stream and a starch/pericarp stream; Subjecting the germ to rapid pressurization/depressurization in order to extract oil and protein from the germ; and separating the starch from the pericarp.

8 Claims, 5 Drawing Sheets

GRAIN FRACTIONATION

BACKGROUND

The present invention relates to a method and to a system for extracting one or more of starch, protein and oil from grains that include a germ.

Grain milling, such as corn milling, has been performed in the United States since about 1842. Two types of grain milling have been developed, wet milling and dry milling. As suggested by the name, wet milling employs water during grinding and in dry milling, grain such as corn, is ground without water.

Over the years, wet grain milling processes have gone from batch processes to continuous processes. One prior art wet milling process is illustrated at 1 in FIG. 2. The wet milling processes have improved in efficiency by re-using aqueous process streams, and by performing counter-current operations, in order to recover corn constituents. Specifically, in wet milling, a soluble protein component of grain is steeped, as shown at 2, in FIG. 2, extracted, and washed before grinding, as shown at 3. Components of grain, such as germ fiber and gluten are extracted, as shown at 4 and 5 before starch is finally washed, as shown at 6 in FIG. 2.

Dry milling of corn has been used to produce similar products to wet milling, such as corn germ and corn grits but without the efficiencies of wet milling that reclaims a high purity starch as a final product. One prior art dry milling process is shown at 100 in FIG. 3.

SUMMARY

DETAILED DESCRIPTION

Figure 1:
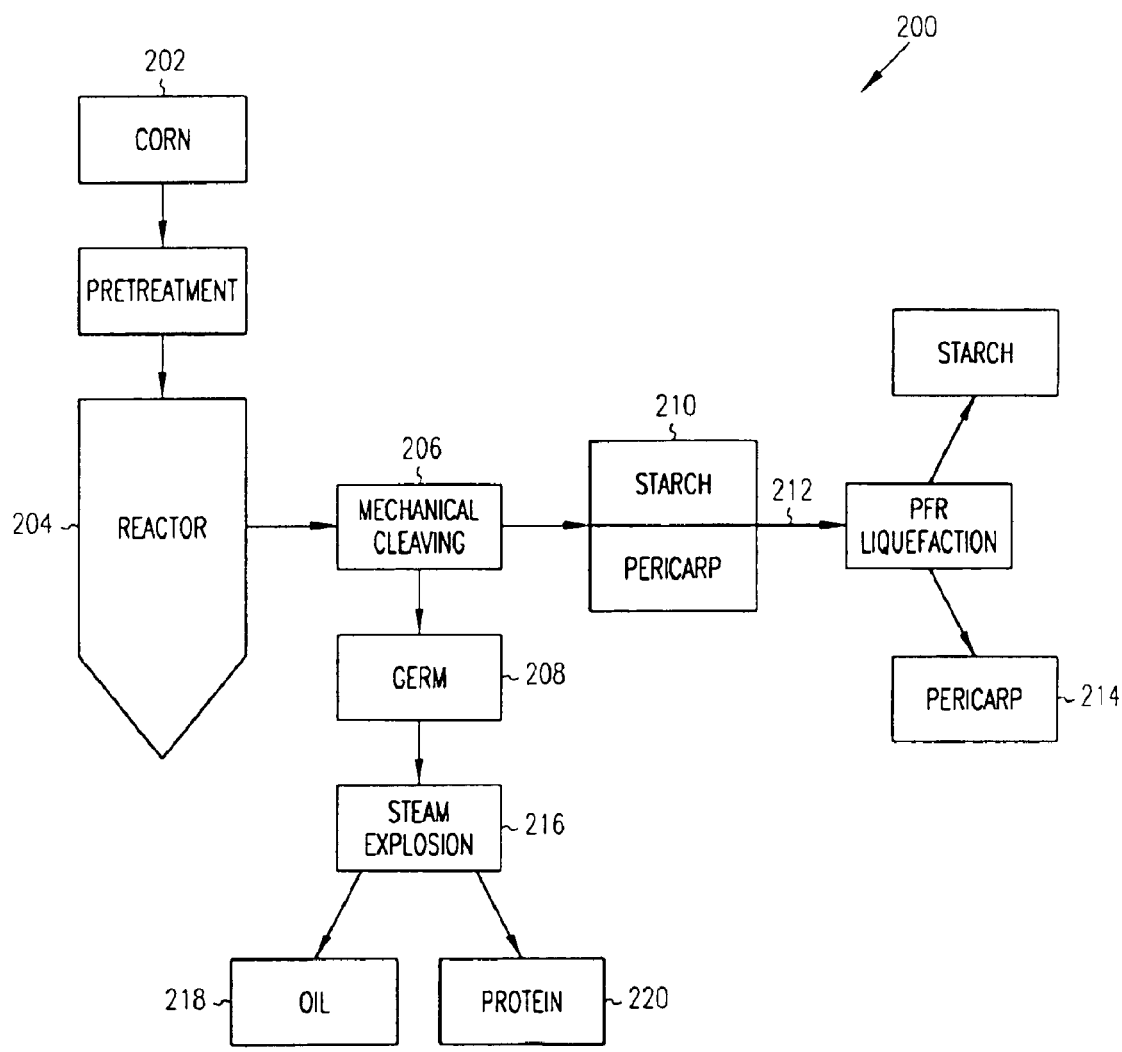
FIG. 1 is a schematic view of one embodiment of the grain fractionation and extraction process of the present invention.
Figure 2:
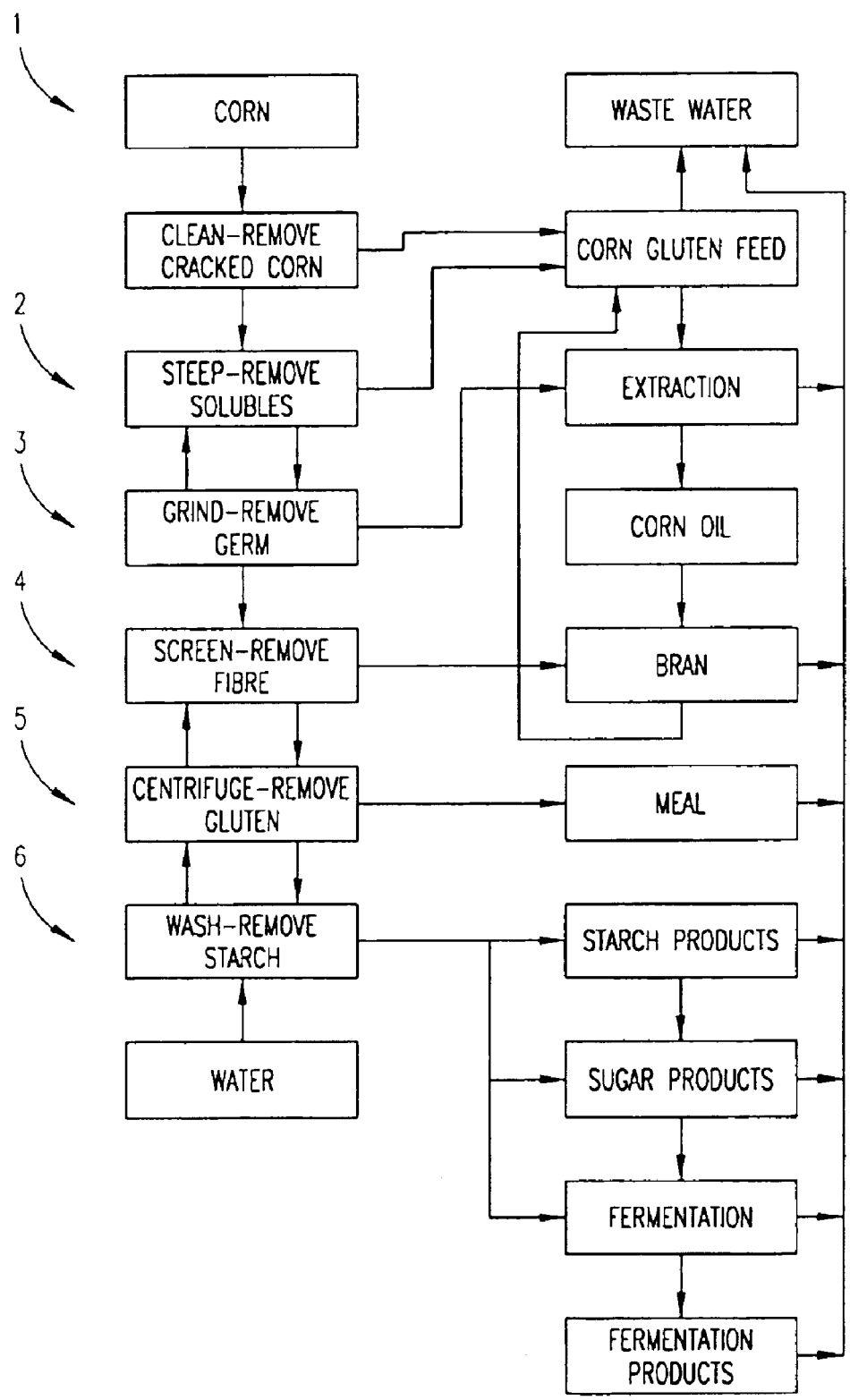
FIG. 2 is a prior art schematic view of one wet milling process embodiment.
Figure 3:
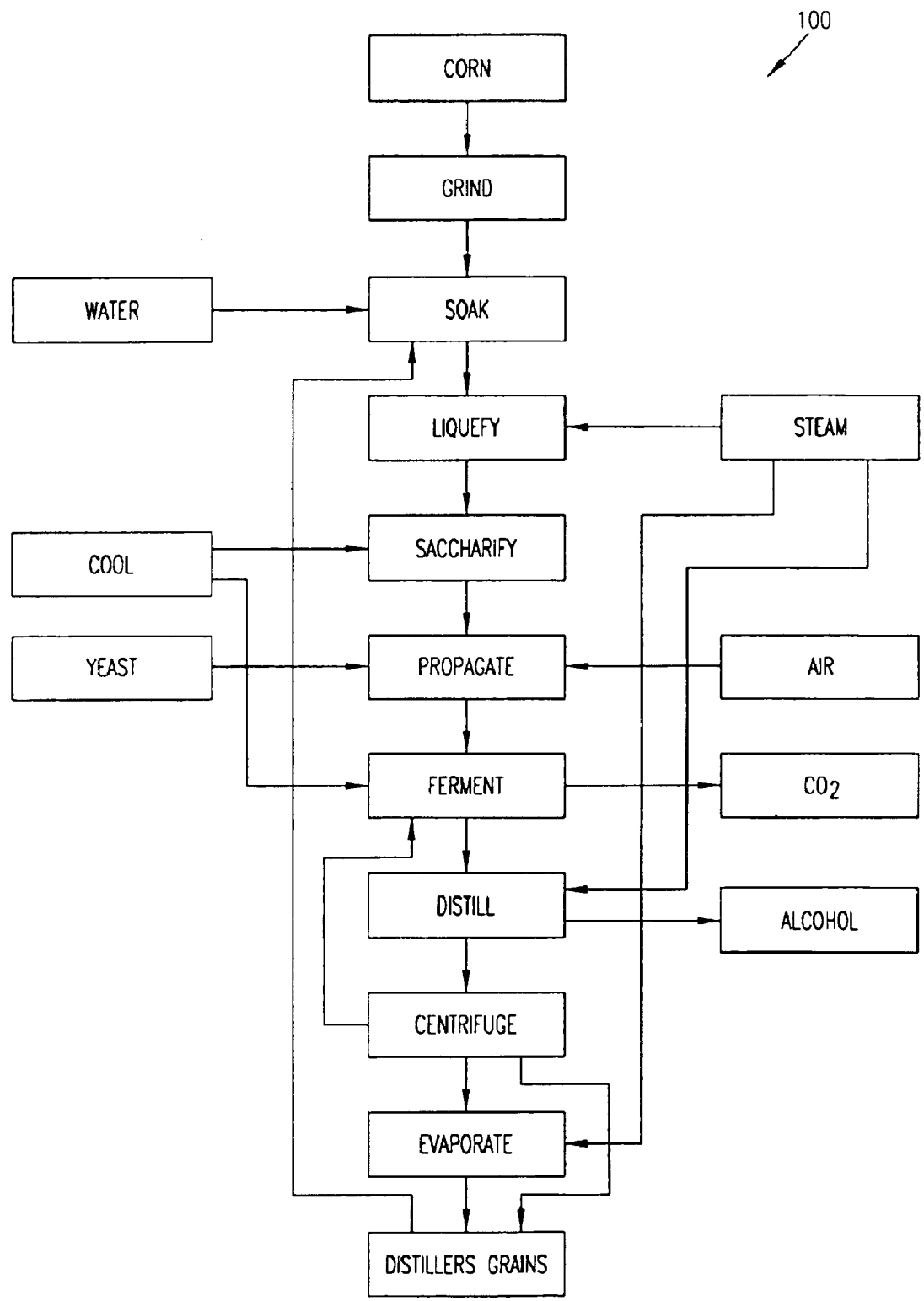
FIG. 3 is a prior art schematic view of one dry milling alcohol process embodiment.

The grain fractionation process of the present invention, one embodiment of which is shown schematically at 200 in FIG. 1, includes providing a grain that includes germ, starch and pericarp fractions, and other optional constituents shown for corn at 202, and pre-treating the grain; steeping the pre-treated grain in a plug flow, counter-current reactor 204; mechanically cleaving the pre-treated steeped grain to separate the germ from the rest of the grain 206; separating the germ 208 from the starch/pericarp portions 210; subjecting the germ to steam explosion 216 to extract oil 218 and protein 220; separating the starch for liquefaction 212; separating the starch from the pericarp 214; and optionally adding dry screenings and other starch containing materials and cereal grains to one or more of extracted starch, oil, or protein. The grain fractionation and extraction process of the present invention converts grains such as corn to starch, oil, protein and other valuable products, without producing substantial waste.

Grains usable in the method of the present invention include any grain with a starch component including hard starch and soft starch and a germ component. Specific usable grains include, but are not limited to corn, maize, rice, oats, sago, barley, canola, cassava, buckwheat, Jerusalem artichokes, mustard seed, flax, fava beans, lentils, peas, rye, safflower, soy, sunflower seeds, tricale, and wheat. Corn usable in the present invention includes commercial corn grade, such as United States Grade No. 2 or any other grade including damaged corn or elevator dust.

The grain pre-treatment includes separating the grain seeds or kernels from other plant structures. In one embodiment, kernels of corn are shelled from a corncob. Separation equipment known to those skilled in the art is usable in separating the corn from cob, stover and stocks. The separated corn particles are cleaned, weighed in bulk, for addition to a steeping reactor for subsequent reaction and preparation to remove the germ.

The description that follows refers to a use of corn. It is understood, however, that other types of grain particles and mixtures of grain particles are suitable for use in the method of the present invention.

Figure 4:
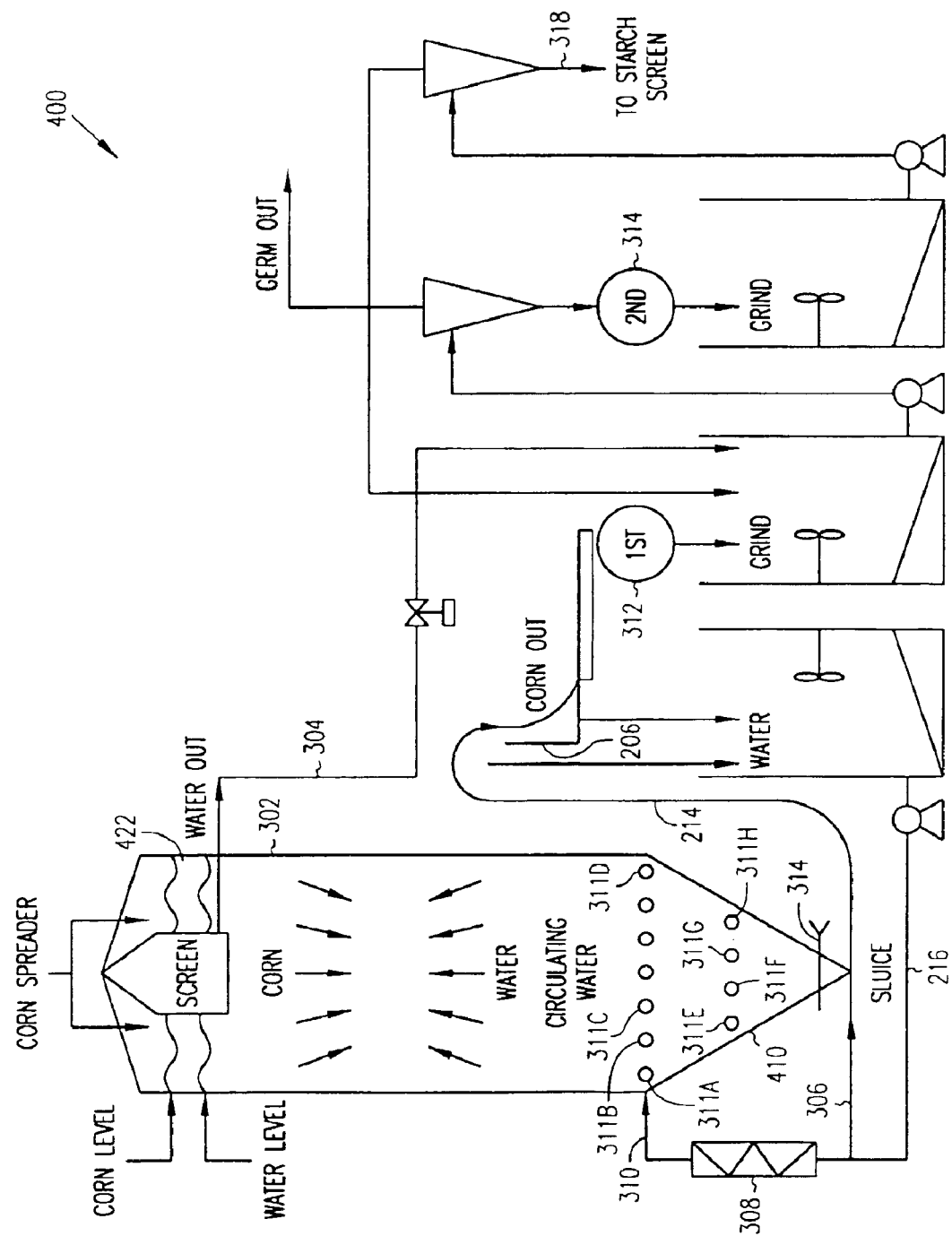
FIG. 4 is a schematic view of a steeping reactor used in the process of the present invention, including germ extraction.

The cleaned, corn kernels are then added to a steeping reactor, one embodiment of which is shown at 300 in FIG. 4, containing water wherein the corn or other grain forms a plug for plug flow down the reactor. Water, in one embodiment, within a range of 125 degrees Fahrenheit to 160 degrees Fahrenheit is percolated through the corn from the bottom to the top of the plug flow. Corn is continuously added to the reactor. Corn is added by spreading the corn kernels on the top of the reactor so that all light corn particles are trapped in the corn before the corn is introduced to steeping water, as shown at 302. The plug flow of corn passes down the reactor while water used for heating, soaking and enzyme reaction flows to the top of the reactor where it is discharged at 304.

Water enters the reactor on a slope of the discharge of the side of the reactor to provide sluice at 306. Enzymes and other optional chemicals are added to initiate the reaction and to control conditions for further processing.

Water is recycled through a heat exchanger control 308 and re-cycled to the reactor above the process recycle water entry point 310. The reactor provides for continuous heating, steeping and enzyme reaction. The water in the reactor has, in one embodiment, a pH of 4.5 to 6.5. The reactor provides for continuous steeping of corn. The flow is counter-current in that a plug flow of corn kernels passes down the reactor 300 while water used for reaction flows to the top of the reactor at 302, where it is discharged at 304.

In the embodiment, illustrated in FIG. 4 the reactor 302 terminates in a central cone 410. The cone is sloped at greater than 67 degrees and has smooth surface of stainless steel or better which is free of rough spots or welds. The water makeup is distributed around the cone and contributes to the free flow of the grain down the slope of the center of the reactor.

Water is added above the cone at 310 and distributed around the tank at 311A, 311B, 311C, 311D, 311E, 311F, 311G, and 311H, arranged to prevent channeling of the plug flow of the corn. Water is recycled for some embodiments and is fresh water for other embodiments. The same steeping reactor 302 is usable to steep corn for a wet milling processor or to treat grain particles with solvent to soften the grain size particles and to extract the soluble portions from the particles.

The interior surface of the reactor 302 is smooth, and free from rough spots or welds. The reactor 302 includes an outlet 304. Water is added at an outside wall distributed above the discharge cone 410. The water is collected at the center of the reactor at the top of the reactor just below the incoming corn. This flow is designed to keep grain particles moving down in a plug flow fashion wherein corn kernels at the outside of the plug move down at the same rate as kernels in the center.

Water used in the steeping process is drawn off at the top of the reactor at 304. As used herein, the term "steep" refers to water exposed to the plug flow, in the reactor 302. The bottom of the reactor is designed with sufficient slope that the corn is continuously removed as a plug flow. Excess water volume is controlled, in one embodiment, with an orifice at the bottom center of the reactor.

The processing performed in the reactor includes soaking of the corn kernels. The cleaned corn kernels are added to the top of the reactor and are soaked for 16 to 20 hours in tepid or warm water at a pH of 4.5 to 6.5. The corn kernels are steeped to facilitate germ separation and removal and to reduce requirements for chemical usage downstream. In particular, steeping "toughens" the germ and renders it easier to separate without fractionation. Steeping removes soluble solids from the corn kernels. As water permeates through the grain membrane, steeping softens the corn kernels and facilitates breaking or rupturing the germ from the remaining corn kernel in subsequent processing.

Heated water is added to the reactor at 311A–H at a rate of 2–3 GPM/ft(2) in order to make up for water discharged out of the reactor at 304. The heated water also controls viscosity of the plug flow, and improves soluble permeation of the corn particles. The heated water activates the maltase enzymes, any recycled enzymes and alpha glucosidases in the grain and facilitates the reaction of any recycled enzymes to convert the soluble starches to sugars. The temperature of the water is high enough to retard yeast fermentation and acetic and lactic acid bacterial reactions.

Once the corn kernel plug reaches the bottom of the reactor, the corn kernel particles are washed with fresh water and are discharged from the reactor at 214. Processing or soaking water is separated from the corn kernels by use of a screen 226 that retains the soaked corn kernels. Steeping water passing through the screen 226 is recycled back into the reactor 300 through makeup line 216. While a particular steeping reactor is described herein, it is believed that other conventionally known counter-current, plug flow steeping reactors are suitable for use in the present invention.

In one embodiment, the steeped corn kernel particles are then passed through a series of pin mills 312 and 314, in order to cleave the germ from the starch component of the steeped corn kernel. One type of mill used in the method of the present invention is a Stedman Cage Mill, manufactured by Stedman of Aurora, Ind. While the Stedman Cage Mill is described, it is believed that other mills are usable for the germ separation of the present invention. The mill is fitted with cage pins and breaker plates. The mill does not include screens or hammers. The pin mills separate the germ from the remainder of the corn kernel without rupturing the germ.

The steeping weakens the structure binding the germ to the remainder of a corn particle so that less energy is required to separate the germ than is required for germ separation of corn kernels that are not pre-soaked for 16 to 20 hours. The structure weakening occurs even though the water is not treated with sulfurous or lactic acid, although, for some embodiments, the water is treated with sulfurous or lactic acid.

The germ fraction floats in a solution of liquid at 16 to 17 percent dry substance (DS). The remaining starch/pericarp portions settle in the solution. The solution is added to a cyclone type reactor for separation. Stages of grind and cyclones are optionally added to improve yield. The germ is then dewatered and washed.

In one embodiment, the corn particle portions are then milled in one or more degerminating mills. The degerminating mills remove any residual germ from the corn particles. The degermination mills also reduce the size of the remainder of corn particles for fiber removal. The germ is separated from the remainder of the corn particles in the degermination mills. Once all the germ is removed, other materials, including other grains, are, in some embodiments, added to the starch/pericarp. Other materials include grain cleanings, dry grain or other cereal grains.

Figure 5:
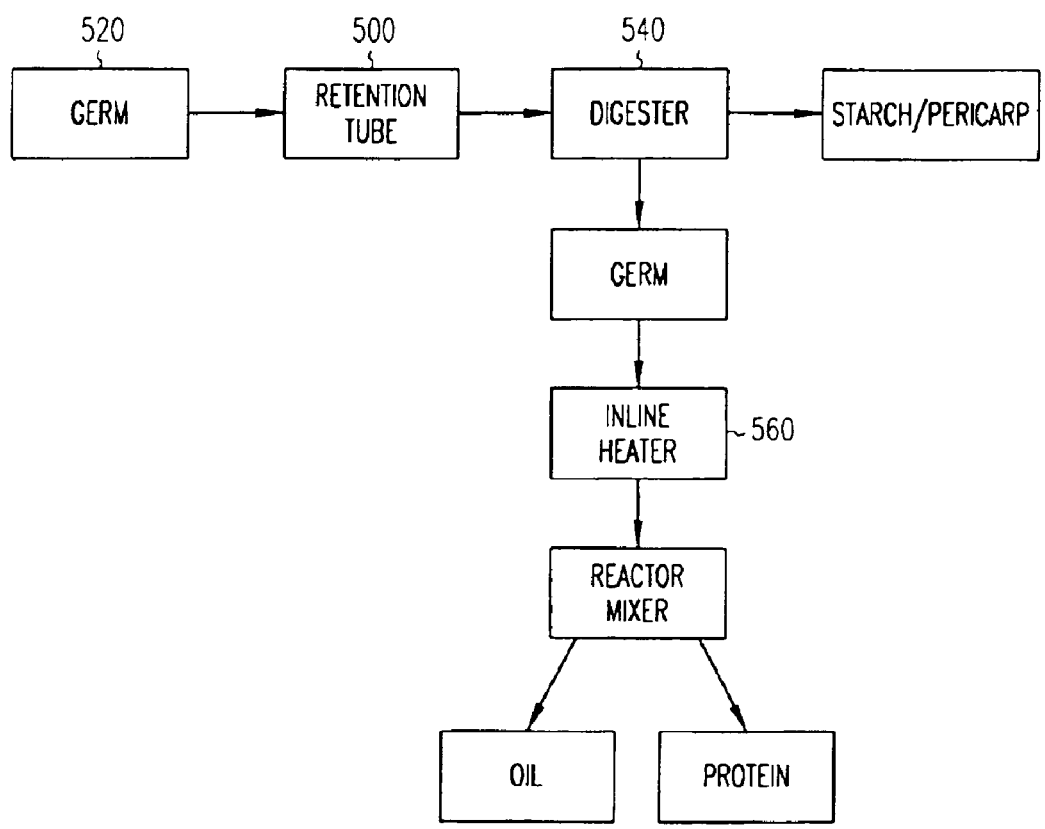
FIG. 5 is a schematic view of an extraction of protein from germ.

The germ is subjected to saturated steam pressurization/depressurization 505, illustrated in FIG. 5. The pressurization/depressurization increases surface area of the germ and that permits separation of oil, protein and other components from the germ.

In one embodiment, the germ 520 is fed to a hopper, which is not shown. The germ is, for some embodiments, optionally sprayed with water either before transfer to the hopper or while in the hopper. The germ exits from the bottom of the hopper into a conveying feeder which contains a conveying mechanism such as a feed screw driven by a variable feed drive, which is not shown. The feed screw or other conveying mechanism feeds the material into a compacting feed tube and then into a pressurized retention tube 500, where the germ particles are formed into a solid plug of material. The solid germ plug is compressed by surface pressures of up to 2000 psi.

The germ is mechanically compacted prior to its introduction into a digester 540. The germ 520 is desirably in a moistened condition. The mechanical compaction removes air from the material prior to its introduction to steam pressurization. Air is undesirable because oxygen in the air tends to oxidatively degrade the germ. Air also exerts a partial pressure and retards temperature and pressure equalization within the reactor.

Steam pressurization, within the pressurized reaction vessel, is typically operated with automatic pressure and temperature control systems. The partial pressure of any air pockets decreases steam pressure and temperature in the reactor below a preselected value. Compaction, followed by processing conditions discussed below, causes a degree of fibrillation of the biomass. Fibrillation of biomass assists in the heat transfer within and around the material.

Next, the germ particles are disintegrated by steam pressure treatment and defibrination within in-line heater 560. In particular, the germ particles are treated with saturated steam at a temperature of from about 160 to 230 degrees Centigrade for a period of time from 2 minutes to 4 hours. The germ particles are disintegrated by this steam treatment. In general, the lower the temperature used, the longer the duration of treatment should be. Thus, for some extractions, it is desirable to treat the germ at 160 degrees Centigrade for about 4 hours. For other extractions, it is desirable to treat the germ for 2 minutes at 230 degrees Centigrade.

This steam treatment separates fractions within the germ by most to least water content. The fractions are separated as extractables such as oil and protein. This steam treatment yields fractions at yields that are predictable by a mass balance of the germ. In other words, the steam treatment and extraction of the present invention permits a user to ascertain bioactive/biofunctional materials present in the germ and to extract the bioactive/biofunctional materials in quantities that approach or are substantially the same as the materials are present in the native germ.

Germ disintegrated this way is then, subsequently, for some embodiments, lixiviated with an aqueous solution of alkali. The concentration of NaOH is typically no greater than about 4% by weight.

In one embodiment, the germ mixture contains between 1 and 20 grams of water per gram of dry germ and preferably about 16 grams of water per gram of dry germ. In one embodiment, the germ mixture contains between 2 and about 50 grams of calcium hydroxide per 100 grams of dry germ and preferably contains 30 grams of calcium hydroxide per 100 grams of dry germ. In another embodiment the germ mixture contains between 2 and 50 grams of alkali, hydroxide of sodium or hydroxide of potassium, per 100 grams of dry germ.

The steam pressure treatment is performed in either a continuous stream or a batch type steam pressure reactor. In one embodiment, the reactor is manufactured by Stake Technology Ltd. Of Ottawa, Canada. One particular device is described in U.S. Pat. No. 4,136,207, which issued Jan. 23, 1979, and which is herein incorporated by reference. The steam pressure treatment is performed in the reactor vessel. The reactor vessel is maintained at a pressure that is between about 200 and 450 psig. The temperature in the reactor is maintained between about 390°F and 460°F. The germ is fed intermittently for some embodiments and continuously for other embodiments. By varying the germ stream but maintaining the reactor vessel conditions, the method of the present invention introduces an efficiency to the process, by avoiding ramp up and ramp down conditions within the reactor vessel.

The germ is introduced into the reaction vessel in a manner that forms a solid plug at the inlet of the vessel. In one embodiment, the solid plug is formed in a device, such as the retention tube 500. The solid germ plug prevents a loss of pressurization in the vessel. The combination of the germ plug and constant pressurization permits instantaneous steam penetration of the germ within the reaction vessel, and thus permits better control of processing times.

The germ is processed at the steam temperatures described for a period of at least about 15 seconds and for some embodiments, at least about 5 minutes. The maximum time is about one hour.

After processing, the germ is cooled and depressurized substantially instantaneously. The germ is in a moisture saturated condition. The germ is subjected to sudden and substantially instantaneous decompression and adiabatic expansion, e.g. by discharging a small quantity of processed biomass into ambient conditions within the in-line heater 560.

The process of instantaneous pressurization and de-pressurization separates the germ into components of oil and protein. The oil product is separated from the protein product by techniques known in the art.

Once the protein is extracted from the germ, the protein, for some embodiments, is heated in a steam heater 580, such as a Komax steam heater and then is hydrolyzed in a static mixer, such as a Komax reactor/static mixer, manufactured by Komax Systems, Inc., of Long Beach, Calif. One reactor/static mixer embodiment is described in U.S. Pat. No. 6,027,241, which is herein incorporated by reference. The reactor/static mixer is, in one embodiment, constructed so that an additive, such as sodium hydroxide is added countercurrent to the main fluid stream. The heater and mixer comprise a heater—mixer system, shown at 580 in FIG. 5.

Within the reactor, at approximately 329°F, protein undergoes a phase transition, depending upon the moisture content, from a solid to a non-Newtonian fluid, somewhat like tooth paste. At temperatures higher than approximately 500°F, depending upon moisture content, the protein begins to pyrolize. Hence, to preserve the quality of the protein product stream, the protein exposure to temperatures above 356°F should be as short as possible. The in-line reactor 560 heater—static mixer 580 system raises the temperature of the protein to between 329°F and 347°F. The time to bring the temperature within this range is typically less than about 10 seconds to about 20 seconds.

Once heated, the protein is reacted with NaOH in the reactor/static mixer. The static mixer accepts the protein, a high viscosity stream and NaOH, the low viscosity stream. The NaOH is injected into the high viscosity stream, mixed by static mixing and a chemical reaction occurs between the alkali and the protein. In particular, the NaOH hydrolyzes the protein. The process of the present invention, unlike conventional protein extraction processes, does not rely upon chemical reactions for extraction. Instead, the process of the present invention utilizes both sophisticated mechanical separation, occurring in the static mixer, coupled with NaOH addition for hydrolysis, for extraction and formation of hydrolysates.

Liquefaction of the starch/pericarp produces a starch gel and a pericarp, low viscosity mixture. In one embodiment, the pericarp, low viscosity mixture is heated and screened. Since the steam is introduced at the suction of the homogenizer, lower pressure steam is employed, such as waste steam from the distillation and evaporation operations. The heating is distributed with a Pick heater, manufactured by Pick of West Bend, Wis.

Fiber is screened out of the low viscosity mixture. In one embodiment, the stream is separately fed to a fiber utilization process, such as is described in U.S. Pat. No. 6,365,732.

In one embodiment, the method of the present invention is performed in a single system. The system includes devices for soaking, germ separation, fiber separation, starch liquefaction, fermentation, and protein separation and concentration. The devices include the devices that have been described herein.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

What is claimed is:

1. A method for extracting one or more of starch, oil, and protein from grain, comprising:

providing kernels or seeds comprising a germ and pericarp comprising protein, oil, and starch;

steeping the kernels or seeds in a steeping reactor for a time effective to soften the the kernels and seeds;

milling the steeped corn kernels to separate the germ from the starch/pericarp forming a germ stream and a starch/pericarp stream;

subjecting the germ to pressurization/depressurization in order to extract oil and protein from the germ; and separating the starch from the pericarp.

2. The method of claim 1, further comprising adding starch containing materials to one or more of starch, oil, or protein.

3. The method of claim 1, wherein the grain provided is selected from the group consisting of corn, maize, rice, oats, sago, barley, canola, cassava, buckwheat, Jerusalem artichokes, mustard seed, flax, fava beans, lentils, peas, rye, safflower, soy, sunflower seeds, tricale, and wheat.

4. The method of claim 1, further comprising cleaning the kernels or seeds prior to steeping.

5. A system for extracting one or more of starch, oil, and protein from grain, comprising:

a steeping reactor effective for loosening a germ component from grain;

a mill effective for separating the germ component from the grain without fracturing the germ; and a steam explosion device for subjecting the germ to pressurization/depressurization to extract oil and protein from the germ.

6. The system of claim 5, further comprising a cyclone reactor for extracting the germ.

7. The system of claim 5, further comprising water which is contained in the steeping reactor.

8. The system of claim 5, wherein the steeping reactor is capable of continuous steeping.

* * * * *